US012694268B2

(12) United States Patent　　　(10) Patent No.:　US 12,694,268 B2
Rawat et al.　　　　　　　　　　　(45) Date of Patent:　Jul. 28, 2026

(54) MULTI-STAGE COMPUTATIONALLY EFFICIENT NEURAL NETWORK INFERENCE

(71) Applicant: Google LLC, Mountain View, CA (US)

(72) Inventors: Ankit Singh Rawat, New York, NY (US); Manzil Zaheer, Mountain View, CA (US); Aditya Krishna Menon, New York, NY (US); Sanjiv Kumar, Jericho, NY (US); Amr Ahmed, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1141 days.

(21) Appl. No.: 17/721,292

(22) Filed: Apr. 14, 2022

(65) Prior Publication Data

US 2022/0335274 A1　　Oct. 20, 2022

Related U.S. Application Data

(60) Provisional application No. 63/175,042, filed on Apr. 14, 2021.

(51) Int. Cl.
|  |  |
|---|---|
| *G06N 3/045* | (2023.01) |
| *G06F 18/21* | (2023.01) |
| *G06F 18/2113* | (2023.01) |
| *G06F 18/214* | (2023.01) |
| *G06F 18/22* | (2023.01) |
| *G06F 18/2431* | (2023.01) |

(52) U.S. Cl.
CPC ......... *G06N 3/045* (2023.01); *G06F 18/2113* (2023.01); *G06F 18/214* (2023.01); *G06F*

*18/217* (2023.01); *G06F 18/22* (2023.01); *G06F 18/2431* (2023.01)

(58) Field of Classification Search
CPC ...... G06N 3/045; G06N 3/084; G06N 3/0895; G06F 18/2113; G06F 18/214; G06F 18/22; G06F 18/2413; G06F 18/24
See application file for complete search history.

(56) References Cited

U.S. PATENT DOCUMENTS

| | | | | |
|---|---|---|---|---|
| 9,224,068 | B1 * | 12/2015 | Ranzato | G06N 3/0464 |
| 12,033,058 | B1 * | 7/2024 | Meier | G06N 3/0895 |
| 2010/0293174 | A1 * | 11/2010 | Bennett | G06F 16/353 |
| | | | | 707/769 |
| 2018/0189668 | A1 * | 7/2018 | Ray | G06N 20/20 |
| 2018/0307950 | A1 * | 10/2018 | Nealis | G06F 5/015 |
| 2019/0179949 | A1 * | 6/2019 | Gerstl | G06F 16/282 |

(Continued)

FOREIGN PATENT DOCUMENTS

| | | | | |
|---|---|---|---|---|
| CN | 109543829 | * | 3/2019 | G06N 3/045 |
| CN | 109543829 | A | 3/2019 | |
| CN | 110738309 | A | 1/2020 | |

OTHER PUBLICATIONS

Office Action in Chinese Appln. No. 202210391735.6, mailed on Jul. 4, 2025, 14 pages (with English translation).

(Continued)

*Primary Examiner* — Phenuel S Salomon

(74) *Attorney, Agent, or Firm* — Fish & Richardson P.C.

(57) ABSTRACT

Methods, systems, and apparatus, including computer programs encoded on computer storage media, for multi-stage computationally-efficient inference using a first and second neural network.

22 Claims, 3 Drawing Sheets

(56) References Cited

U.S. PATENT DOCUMENTS

| | | | |
|---|---|---|---|
| 2019/0180176 A1* | 6/2019 | Yudanov | G06N 3/09 |
| 2019/0258878 A1* | 8/2019 | Koivisto | G01S 7/417 |
| 2020/0034703 A1 | 1/2020 | Fukuda et al. | |
| 2020/0387798 A1* | 12/2020 | Hewage | G06N 3/0455 |
| 2021/0150370 A1 | 5/2021 | McDonnell et al. | |
| 2022/0101098 A1* | 3/2022 | Li | G06N 3/0499 |

OTHER PUBLICATIONS ai.googleblog.com [online], "Exploring Massively Multilingual, Massive Neural Machine Translation," Oct. 11, 2019, retrieved on Aug. 15, 2022, retrieved from URL<https://ai.googleblog.com/2019/10/exploring-massively-multilingual.html>, 5 pages.

Bapna et al., "Controlling Computation versus Quality for Neural Sequence Models," arXiv, Apr. 16, 2020, 13 pages.

Bartlett et al., "Classification with a Reject Option using a Hinge Loss," Journal of Machine Learning Research, Aug. 2008, 9:1823-1840.

Bolukbasi et al., "Adaptive Neural Networks for Efficient Inference," Proceedings of the 34th International Conference on Machine Learning, 2017, 70:527-536.

Brown et al., "Language Models are Few-Shot Learners," Advances in Neural Information Processing Systems, 2020, 25 pages.

Bucila et al., "Model compression," Proceedings of the 12th ACM SIGKDD International Conference on Knowledge Discovery and Data Mining, Aug. 2006, pp. 535-541.

Cao et al., "Learning Imbalanced Datasets with Label-Distribution-Aware Margin Loss," Advances in Neural Information Processing Systems, 2019, 12 pages.

Carreira-Perpinan, "Model compression as constrained optimization, with application to neural nets. Part I: general framework," arXiv, Jul. 5, 2017, 23 pages.

Cho et al., "On the Efficacy of Knowledge Distillation," Proceedings of the IEEE/CVF International Conference on Computer Vision, Oct. 2019, pp. 4794-4802.

Chung et al., "Hierarchical Multiscale Recurrent Neural Networks," arXiv, Dec. 14, 2016, 13 pages.

cloudblogs.microsoft.com [online], "Microsoft open sources breakthrough optimizations for transformer inference on GPU and CPU," Jan. 21, 2020, retrieved on Aug. 15, 2022, retrieved from URL<https://cloudblogs.microsoft.com/opensource/2020/01/21/microsoft-onnx-open-source-optimizations-transformer-inference-gpu-cpu/>, 6 pages.

Cortes et al., "Boosting with abstention," Advances in Neural Information Processing Systems, 2016, 9 pages.

Crankshaw et al., "Clipper: A low-latency prediction serving system," Proceedings of the 14th USENIX Conference on Networked Systems Design and Implementation, Mar. 2017, pp. 613-627.

Cui et al., "Class-balanced loss based on effective No. of samples," Proceedings of the IEEE/CVF Conference on Computer Vision and Pattern Recognition (CVPR), Jun. 2019, pp. 9268-9277.

Dabre et al., "Balancing cost and benefit with tied-multi transformers," arXiv, Feb. 20, 2020, 10 pages.

Elbayad et al., "Depth-adaptive transformer," arXiv, Feb. 14, 2020, 15 pages.

Fan et al., "Reducing transformer depth on demand with structured dropout," arXiv, Sep. 25, 2019, 15 pages.

Fang et al., "Serving deep neural networks at the cloud edge for vision applications on mobile platforms," Proceedings of the 10th ACM Multimedia Systems Conference, Jun. 2019, pp. 36-47.

Fedus et al., "Switch transformers: Scaling to trillion parameter models with simple and efficient sparsity," arXiv, Jun. 16, 2022, 40 pages.

Foret et al., "Sharpness-aware minimization for efficiently improving generalization," arXiv, Apr. 29, 2021, 20 pages.

Furlanello et al., "Born Again Neural Networks," Proceedings of the 35th International Conference on Machine Learning, 2018, 10 pages.

Ganesh et al., "Compressing Large-Scale Transformer-Based Models: A Case Study on BERT," Transactions of the Association for Computational Linguistics, Sep. 21, 2021, 9:1061-1080.

Geifman et al., "Selective Classification for Deep Neural Networks," Advances in Neural Information Processing Systems, 2017, 10 pages.

Ghiasi et al., "Simple Copy-Paste Is a Strong Data Augmentation Method for Instance Segmentation," Proceedings of the IEEE/CVF Conference on Computer Vision and Pattern Recognition (CVPR), Jun. 2021, pp. 2918-2928.

Gordon et al., "Compressing BERT: Studying the Effects of Weight Pruning on Transfer Learning," Proceedings of the 5th Workshop on Representation Learning for NLP, Jul. 2020, pp. 143-155.

Grandvalet et al., "Support vector machines with a reject option," Advances in Neural Information Processing Systems, 2009, 8 pages.

Graves, "Adaptive computation time for recurrent neural networks," arXiv, Apr. 18, 2016, 19 pages.

Han et al., "Deep compression: Compressing deep neural networks with pruning, trained quantization and huffman coding," arXiv, Nov. 20, 2015, 13 pages.

Hassibi et al., "Second order derivatives for network pruning: Optimal Brain Surgeon," Advances in Neural Information Processing Systems, 1992, 8 pages.

He et al., "Deep Residual Learning for Image Recognition," Proceedings of the IEEE Conference on Computer Vision and Pattern Recognition (CVPR), Jun. 2016, pp. 770-778.

He et al., "Identity Mappings in Deep Residual Networks," European Conference on Computer Vision, 2016, 6 pages.

Hinton et al., "Distilling the knowledge in a neural network," aXiv, Mar. 9, 2015, 9 pages.

Howard et al., "Searching for MobileNetV3," Proceedings of the IEEE/CVF International Conference on Computer Vision (ICCV), Oct. 2019, pp. 1314-1324.

Huang et al., "GPipe: Efficient Training of Giant Neural Networks using Pipeline Parallelism," Advances in Neural Information Processing Systems, 2019, 10 pages.

Jouppi et al., "In-Datacenter Performance Analysis of a Tensor Processing Unit," Proceedings of the 44th Annual International Symposium on Computer Architecture, Jun. 2017, 12 pages.

Kang et al., "Decoupling Representation and Classifier for Long-Tailed Recognition," arXiv, Feb. 19, 2020, 16 pages.

Kolesnikov et al., "Big transfer (bit): General visual representation learning," arXiv, May 5, 2020, 28 pages.

Kovaleva et al., "Revealing the Dark Secrets of BERT," arXiv, Sep. 11, 2019, 11 pages.

Krizhevsky, "Learning multiple layers of features from tiny images," Apr. 8, 2009, 60 pages.

LeCun et al., "Optimal Brain Damage" Advances in Neural Information Processing Systems, 1989, 2:598-605.

Li et al., "Train Big, Then Compress: Rethinking Model Size for Efficient Training and Inference of Transformers," Proceedings of the 37th International Conference on Machine Learning, Jul. 2020, 11 pages.

Liang et al., "Pruning and quantization for deep neural network acceleration: A survey," Neurocomputing, Oct. 21, 2021, 461:370-403.

Liu et al., "FastBERT: a Self-distilling BERT with Adaptive Inference Time," arXiv, Apr. 29, 2020, 10 pages.

Menon et al., "Long-tail learning via logit adjustment," arXiv, Jul. 9, 2021, 27 pages.

Menon et al., "Why distillation helps: A statistical perspective," arXiv, May 21, 2020, 21 pages.

Mirzadeh et al., "Improved Knowledge Distillation via Teacher Assistant," AAAI Technical Track: Machine Learning, Apr. 3, 2020, pp. 5191-5198.

Mozer et al., "Skeletonization: A Technique for Trimming the Fat from a Network via Relevance Assessment," Advances in Neural Information Processing Systems, 1988, pp. 107-115.

Muller et al., "When does label smoothing help?" Advances in Neural Information Processing Systems, 2019, 10 pages.

(56) References Cited

OTHER PUBLICATIONS

Ni et al., "On the Calibration of Multiclass Classification with Rejection," Advances in Neural Information Processing Systems, 2019, 11 pages.

Raffel et al., "Exploring the limits of transfer learning with a unified text-to-text transformer," Journal of Machine Learning Research, Jun. 2020, 21:1-67.

Raganato et al., "Fixed Encoder Self-Attention Patterns in Transformer-Based Machine Translation," arXiv, Oct. 5, 2020, 13 pages.

Rajpurkar et al., "SQUAD: 100,000+ Questions for Machine Comprehension of Text," Proceedings of the 2016 Conference on Empirical Methods in Natural Language Processing, Nov. 2016, pp. 2383-2392.

Ramaswamy et al., "Consistent algorithms for multiclass classification with an abstain option," Electron. J. Statist., 2018, 12(1):530-554.

Romero et al., "FitNets: Hints for Thin Deep Nets," arXiv, Dec. 19, 2014, 12 pages.

Rowley et al., "Neural network-based face detection, " IEEE Transactions on Pattern Analysis and Machine Intelligence, Jan. 1998, 20(1):23-38.

Russakovsky et al., "ImageNET Large Scale Visual Recognition Challenge," International Journal of Computer Vision, Apr. 11, 2015, 115:211-252.

Rusu et al., "Policy distillation," arXiv, Jan. 7, 2016, 13 pages.

Schwartz et al., "The Right Tool for the Job: Matching Model and Instance Complexities," Proceedings of the 58th Annual Meeting of the Association for Computational Linguistics, Jul. 2020, pp. 6640-6651.

Sun et al., "MobileBERT: a Compact Task-Agnostic BERT for Resource-Limited Devices," Proceedings of the 58th Annual Meeting of the Association for Computational Linguistics, Jul. 2020, pp. 2158-2170.

Sun et al., "Revisiting Unreasonable Effectiveness of Data in Deep Learning Era," Proceedings of the IEEE International Conference on Computer Vision (ICCV), Oct. 2017, pp. 843-852.

Szegedy et al., "Rethinking the Inception Architecture for Computer Vision," Proceedings of the IEEE Conference on Computer Vision and Pattern Recognition (CVPR), Jun. 2016, pp. 2818-2826.

Tan et al., "EfficientNet: Rethinking Model Scaling for Convolutional Neural Networks," Proceedings of the 36th International Conference on Machine Learning, Jun. 2019, 10 pages.

Van Horn et al., "The Devil is in the Tails: Fine-grained Classification in the Wild," arXiv, Sep. 5, 2017, 22 pages.

Viola et al., "Rapid object detection using a boosted cascade of simple features," Proceedings of the 2001 IEEE Computer Society Conference on Computer Vision and Pattern Recognition, Dec. 2001, pp. 511-518.

Wang et al., "IDK Cascades: Fast Deep Learning by Learning not to Overthink," arXiv, Sep. 13, 2017, 8 pages.

Wang et al., "Learning to Model the Tail," Advances in Neural Information Processing Systems, 2017, 11 pages.

Wang et al., "SkipNet: Learning Dynamic Routing in Convolutional Networks," Proceedings of the European Conference on Computer Vision (ECCV), Sep. 2018, pp. 409-424.

Xie et al., "Self-Training With Noisy Student Improves ImageNet Classification," Proceedings of the IEEE/CVF Conference on Computer Vision and Pattern Recognition (CVPR), Jun. 2020, pp. 10687-10698.

Xu et al., "Classifier cascades and trees for minimizing feature evaluation cost," Journal of Machine Learning Research, Jun. 2014, 15(62):2113-2144.

Yuan et al., "Revisiting Knowledge Distillation via Label Smoothing Regularization," Proceedings of the IEEE/CVF Conference on Computer Vision and Pattern Recognition (CVPR), Jun. 2020, pp. 3903-3911.

Zadeh et al., "GOBO: Quantizing Attention-Based NLP Models for Low Latency and Energy Efficient Inference," 2020 53rd Annual IEEE/ACM International Symposium on Microarchitecture (MICRO), Athens, Greece, Oct. 17-21, 2020, pp. 811-824.

Zhang et al., "Accelerating Large Scale Deep Learning Inference through DeepCPU at Microsoft," Proceedings of the 2019 USENIX Conference on Operational Machine Learning, May 20, 2019, 4 pages.

Zhang et al., "Deep learning in the era of edge computing: Challenges and opportunities," Fog Computing: Theory and Practice, Apr. 25, 2020, pp. 67-78.

Zhu et al., "Capturing Long-tail Distributions of Object Subcategories," Proceedings of the IEEE Conference on Computer Vision and Pattern Recognition (CVPR), Jun. 2014, pp. 915-922.

International Search Report and Written Opinion in International Appln. No. PCT/US2022/031468, mailed Oct. 14, 2022, 24 pages.

So et al., "The evolved transformer," arXiv, May 17, 2019, 14 pages.

* cited by examiner

200

Obtain new network input — 202

Process new network input using first neural network — 204

First network output likely inaccurate? — 206

N

Classify new network input based on first network output — 212

Y

Provide new network input to second neural network — 208

Classify new network input based on second network output — 210

300

302 — Obtain batch of training network inputs

304 — Generate pseudo labels using second neural network

306 — Train neural network to minimize loss function

MULTI-STAGE COMPUTATIONALLY EFFICIENT NEURAL NETWORK INFERENCE

CROSS-REFERENCE TO RELATED APPLICATION

This application claims priority to U.S. Provisional Application No. 63/175,042, filed on Apr. 14, 2021. The disclosure of the prior application is considered part of and is incorporated by reference in the disclosure of this application.

BACKGROUND

This specification relates to classifying inputs using a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a classification task on a new network input using a first neural network and, for some inputs, a second neural network.

Particular embodiments of the subject matter described in this specification can be implemented so as to realize one or more of the following advantages.

This specification describes a two stage inference mechanism that first uses a computationally lightweight student neural network (also referred to as a "first neural network") to make a prediction. If the student neural network is confident in the accuracy of the prediction, the system emits the prediction. Only if the student neural network is not confident in the accuracy of the prediction, the system uses a more computationally expensive teacher neural network (also referred to as a "second neural network") to make a prediction and then emits the prediction of the teacher.

Because the student neural network is generally confident on all "easy" instances and because data in the real-world, i.e., at inference time in production settings, is heavily long-tailed, a large fraction of the inference time queries to the system are processed only using the student. Data being "long-tailed" refers to the majority of the data belonging to a proper subset of categories ("easy" categories) with only a small amount of the data belonging to a small number of remaining categories ("hard" categories). Thus, the vast majority of inputs in the real-world will be examples for which the student neural network is confident and, therefore, the teacher neural network does not need to be used.

When the student is not confident, which only happens for a small number of hard examples at inference time, the system falls-back to the larger ("giant") teacher model. Thus, an accurate prediction can be generated for all inference time inputs while only making use of a large teacher model for a small fraction of the inputs. This allows for inference to remain computationally efficient (in particular for "easy" examples that are handled using only the lightweight student model) but with dramatically increased prediction/classification accuracy.

Moreover, this two-stage inference can be particularly useful in a modern setup like edge computing and 5G cloudlets, where a lightweight student model runs on a device to make most of the predictions with low latency and only rarely does a hard instance need to be delegated to a shared giant teacher model running in the cloud. That is, the described techniques allow for the vast majority of inference time inputs to be handled entirely at the edge computing device, with only a small number of inference time inputs being routed to the cloud for processing. This drastically reduces the amount of data that needs to be sent over a data communication network relative to conventional approaches that route all inputs to the cloud for processing while dramatically increasing the accuracy of predictions/classifications relative to approaches that make all predictions locally at the edge computing device with only a minimal amount of increased network traffic.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
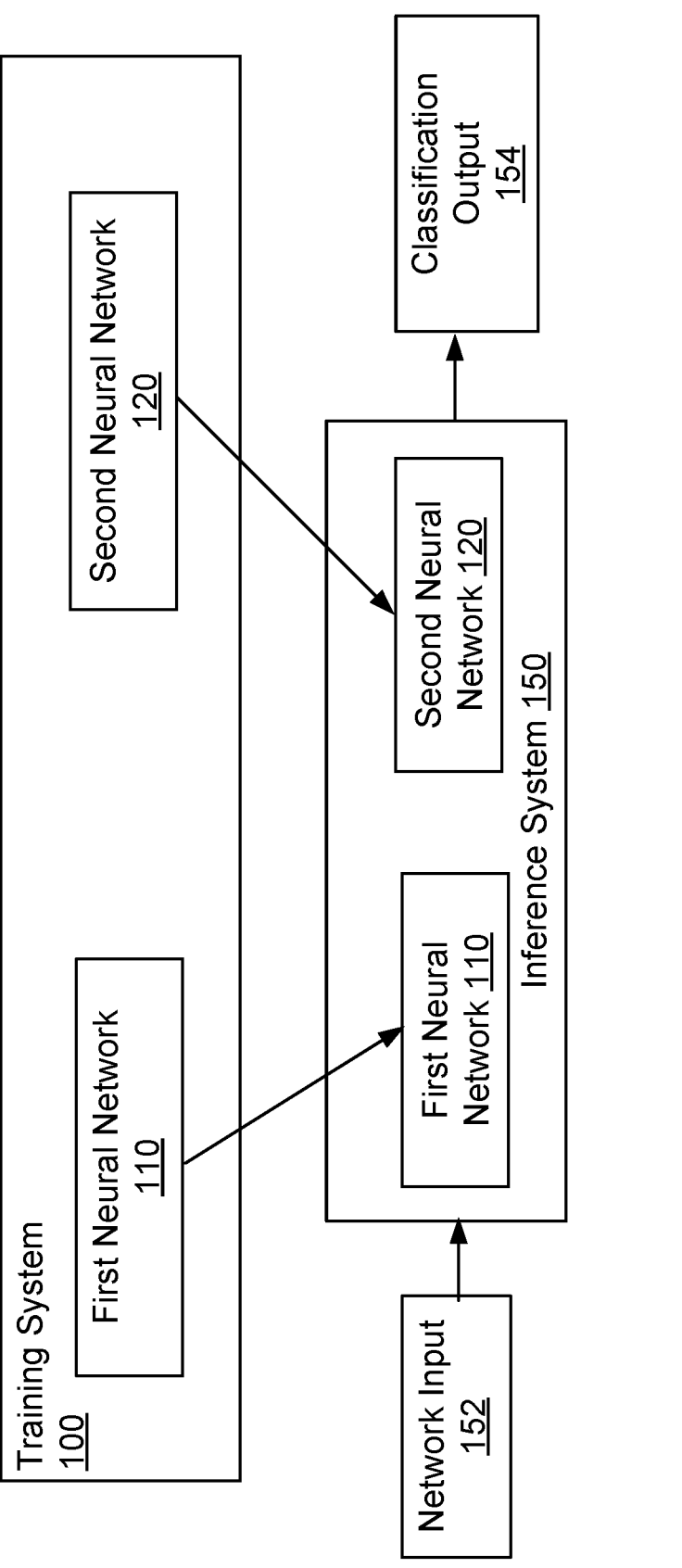
FIG. 1 shows an example training system and an example inference system.

FIG. 1 shows an example training system 100 and an example inference system 150.

The training system 100 and the inference system 150 are examples of systems implemented as computer programs on one or more computers in one or more locations, in which the systems, components, and techniques described below can be implemented. The system 100 and the system 150 can be implemented on the same set of one or more computers or on different sets of one or more computers in different locations.

The training system 100 trains a first neural network 110 and a second neural network 120 on training data 102 to perform a classification task.

Once the first neural network 110 and the second neural network 120 have been trained, the inference system 150 uses the trained first neural network 110 and the second neural network 120 to perform inference, i.e., to receive a new network input 152 and to process the new network input 152 to generate a classification output 154 for the classification task.

The neural networks 110 and 120 can be configured to perform any of a variety of classification tasks. As used in this specification, a classification task is any task that that requires the neural network 110 or 120 to generate an output that includes a respective score for each of a set of multiple categories and to then select one or more of the categories as a "classification" for the network input using the respective scores.

One example of a classification task is image classification, where the input to the neural network 110 is an image, i.e., the intensity values of the pixels of the image, the categories are object categories, and the task is to classify the image as depicting an object from one or more of the object categories. That is, the classification output for a given input image is a prediction of one or more object categories that are depicted in the input image.

Another example of a classification task is text classification, where the input to the neural network 110 is text and the task is to classify the text as belonging to one multiple categories. One example of such a task is sentiment analysis task, where the categories each correspond to different possible sentiments of the task. Another example of such a task is a reading comprehension task, where the input text includes a context passage and a question and the categories each correspond to different segments from the context passage that might be an answer to the question. Other examples of text processing tasks that can be framed as classification tasks include an entailment task, a paraphrase task, a textual similarity task, a sentiment task, a sentence completion task, a grammaticality task, and so on.

Other examples of classification tasks include speech processing tasks, where the input to the neural network is audio data representing speech. Examples of speech processing tasks include language identification (where the categories are different possible languages for the speech), hotword identification (where the categories indicate whether one or more specific "hotwords" are spoken in the audio data), and so on.

As another example, the task can be a health prediction task, where the input is a sequence derived from electronic health record data for a patient and the categories are respective predictions that are relevant to the future health of the patient, e.g., a predicted treatment that should be prescribed to the patient, the likelihood that an adverse health event will occur to the patient, or a predicted diagnosis for the patient.

Thus, as described above, the neural networks 110 and 120 are configured to process a network input to generate an output that includes a respective score for each of a set of multiple categories.

The first neural network 110 and the second neural network 120 are generally both neural networks that are configured to perform the same classification task.

In some cases, the first neural network 110 and the second neural network 120 have the same architecture and, therefore the same number of parameters. For example, both neural networks can be convolutional neural networks, self-attention-based neural networks (Transformers), or recurrent neural networks.

In some other cases, however, the two neural networks have different architectures, with the second neural network 120 having a larger number of parameters than the first neural network 110. In these cases, at inference, a larger, less computationally efficient second neural network 120 is used to improve the performance of a smaller, computationally efficient first neural network 110.

For example, both neural networks can be convolutional neural networks, self-attention-based neural networks (Transformers), or recurrent neural networks, but with the first neural network 110 having fewer parameters because of having fewer layers, operating on internal representations that have smaller sizes (e.g., fewer output filters in the case of a convolutional layer or smaller dimensions of the queries, keys, and values for a self-attention sub-layer in a Transformer), or both.

For example, at inference, the first neural network 110 can be deployed on an edge computing device or in another computing environment with limited computational budget while the second neural network 120 is deployed on a cloud computing system that includes one or more computers remote from the first neural network 110, e.g., in the cloud where a larger amount of computational resources are available.

Thus, as will be described below, extra computational resources can be successfully leveraged to improve the performance of the first neural network 110 on "long tail" or "hard" network inputs while only using the computationally efficient first neural network 110 for "easy" inputs.

As another example, at inference, the first neural network 110 and the second neural network 120 can be deployed on the same set of one or more computers, but the first neural network 110 can be deployed on different hardware than the second neural network 120. For example, the first neural network 110 can be deployed on (and, in some cases, optimizer for) one or more ASICs of a computer, e.g., a vision processing unit (VPU), a tensor processing unit (TPU), a graphics processing unit (GPU), while the second neural network 120 can be executed on other hardware, e.g., using one or more central processing units (CPUs), of the computer. As a result, "easy" inputs can be processed with reduced latency, with reduced power consumption, or both due to the first neural network 110 being deployed on the ASICs, while the second neural network 120 can be used to ensure that prediction quality remains high for "hard" inputs.

More specifically, at inference, the system 150 uses the first and second neural networks 110 and 120 to perform inference on new network inputs 104. That is, the system 150 uses the two neural networks to generate a respective classification output 154 for each network input 104.

In particular, when the system 150 obtains a new network input 152, the system 150 processes the new network input 104 using the first neural network 110 to generate a first network output that includes a respective first score for each of a first set of categories, i.e., for all of the categories required by the classification task. Optionally, the first network output also includes a score for an "abstain" class, as will be described in more detail below.

The system 150 determines, from the first network output, whether the first network output is likely to be inaccurate. Determining whether a given network output generated by the first neural network 110 is likely to be inaccurate is described in more detail below with reference to FIG. 2.

In response to determining that the first network output is not likely to be inaccurate, i.e., that the output is likely to be accurate, the system 150 generates the classification output 154 using the first network output, e.g., by providing the first network output as the classification output 154 or by selecting one or more highest scoring categories according to the first network output and providing, as the classification output 154, data identifying the selected categories and, optionally, the first scores for the selected categories. That is, in response to determining that the first network output is not likely to be inaccurate, the system 150 classifies the new network input 152 based on the first network output without providing the new network input 152 as input to the second neural network 120, i.e., without using the second neural network 120.

In response to determining that the first network output is likely to be inaccurate, the system 150 provides the new network input 152 as input to the second neural network 120. The second neural network 120 is configured to process the new network input 104 to generate a second network output that includes a respective second score for each of a second set of categories. Generally, the second set of categories includes all of the categories in the first set of categories and, optionally, one or more additional categories. That is, in some implementations, the first set of categories is the same as the second set of categories and both include all of the categories for the classification task.

The system 150 then classifies the new network input 152 based on the second network output. That is, the system 150 generates the classification output 154 using the second network output, e.g., by providing the second network output as the classification output 154 or by selecting one or more highest scoring categories according to the second network output and providing, as the classification output 154, data identifying the selected categories and, optionally, the second scores for the selected categories.

Thus, the system 150 only makes use of the second neural network 120 (only provides the new network input as input to the second neural network) when the system determines that the first network output is likely to be inaccurate. In other words, the system 150 only makes use of the second neural network 120 for network inputs that are considered to be "hard" and only uses the first neural network 110 for network inputs that are considered to be "easy" because the first neural network 110 is confident that its output is accurate.

Thus, in the example where the first neural network 110 is deployed on the edge computing device or in another computing environment with limited computational budget while the second neural network 120 is deployed on the cloud computing system that includes one or more computers remote from the first neural network 110, the system 150 can process the new network input 104 using the first neural network 110 locally on the edge computing device and only send the new network input 104 to the cloud computing system for processing by the second neural network 120 in response to determining that the first network output is likely to be inaccurate.

Thus, as will be described below, extra computational resources can be successfully leveraged to improve the performance of the first neural network 110 on "long tail" or "hard" network inputs while only using the computationally efficient first neural network 110 for "easy" inputs, ensuring that the vast majority of inputs are processed locally on the device 160 with minimal latency.

As another example, when the first neural network 110 and the second neural network 120 are deployed on the same set of one or more computers, but the first neural network 110 can be deployed on different hardware than the second neural network 120, the system 150 the system 150 can process the new network input 104 using the first neural network 110 locally on the hardware, e.g., the one or more ASICs, dedicated to the first neural network 110 and only send the new network input 104 for processing on the hardware dedicated to the second neural network 120 in response to determining that the first network output is likely to be inaccurate. As a result, "easy" inputs can be processed with reduced latency, with reduced power consumption, or both due to the first neural network 110 being deployed on the ASICs, while the second neural network 120 can be used to ensure that prediction quality remains high for "hard" inputs.

As described above, prior to using the neural network 110 and 120 to perform inference, the training system 100 trains the two neural networks on training data 102.

More specifically, the training system 100 trains the neural networks 110 and 120 using distillation. In distillation, the system 100 trains the second neural network 120 first and then uses the outputs of the trained second neural network 120 as part of training the first neural network 110.

Generally, the system can use any appropriate distillation technique to train the neural networks 110 and 120 on the training data 102.

In a distillation technique, the outputs of one neural network (in this case, the second neural network 120) are used to generate the targets for the training of another neural network (in this case, the first neural network 110).

That is, the system 100 first trains the second neural network 120 and then uses the trained second neural network 120 to train the first neural network 110.

Examples of distillation techniques are described in more detail below with reference to FIG. 3.

Figure 2:
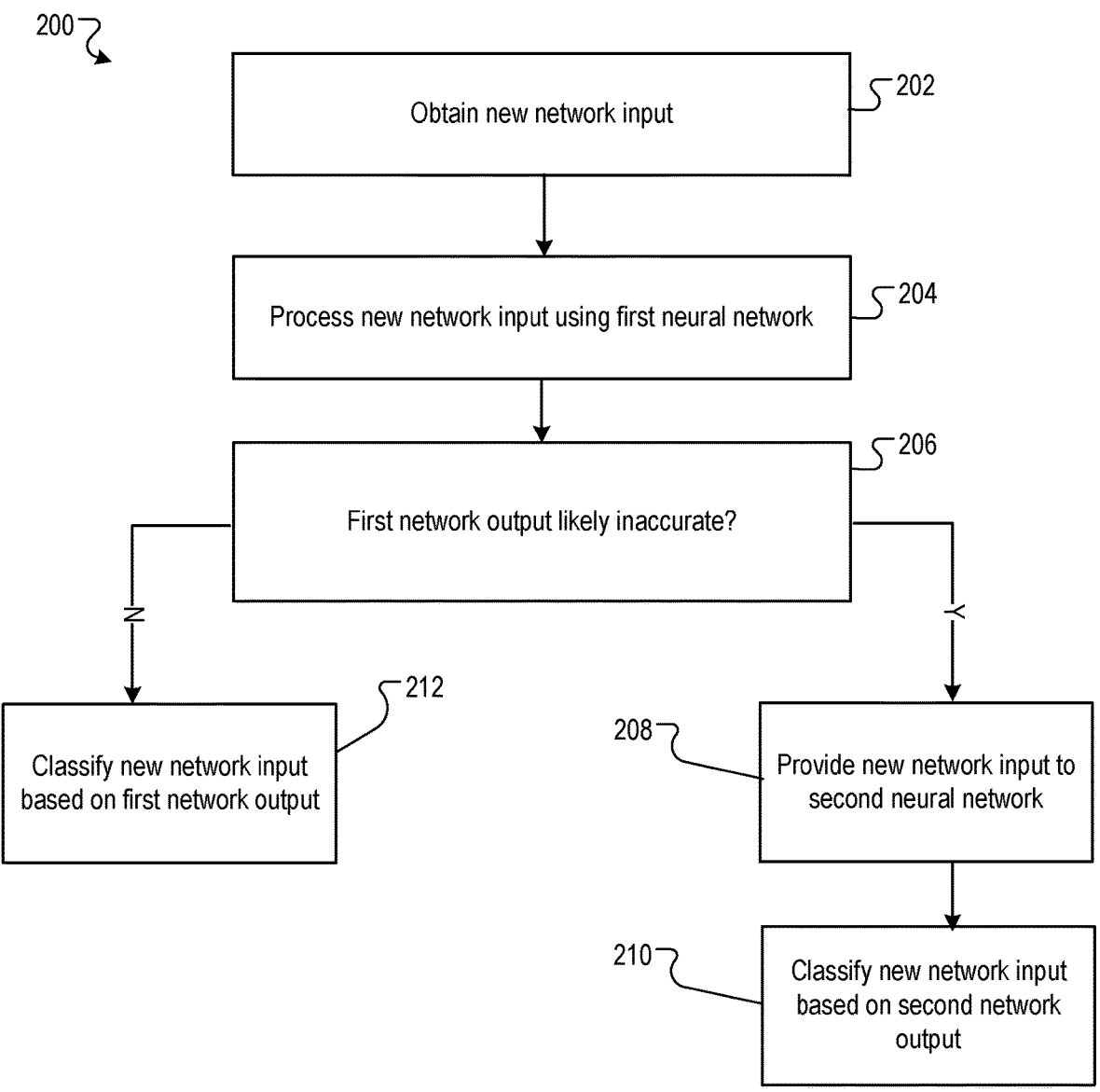
FIG. 2 is a flow diagram for generating a classification output for a new network input.

FIG. 2 is a flow diagram of an example process 200 for generating a classification output for a new network input. For convenience, the process 200 will be described as being performed by a system of one or more computers located in one or more locations. For example, an inference system, e.g., the inference system 150 of FIG. 1, appropriately programmed in accordance with this specification, can perform the process 200.

The system obtains a new network input (step 202).

The system processes the new network input using the first neural network to generate a first network output that includes a respective first score for each of a first set of categories (step 204).

The system determines, from the first network output, whether the first network output is likely to be inaccurate (step 206).

The system can determine whether the first network output is likely to be inaccurate in any of a variety of ways.

In some implementations, the system determines whether the first network output is likely to be inaccurate based on which category of the first set of categories has the highest first score. In particular, the system can determine whether the category having the highest first score is in a first predetermined proper subset of the first plurality of categories. If so, the system determines that the first network output is likely to be inaccurate when the category having the highest first score is in the predetermined proper subset of the plurality of categories.

The system or another system (e.g., the training system 100 of FIG. 1) can select the first proper subset so that categories in the first proper subset are more likely to be associated with inaccurate classifications by the first neural network than categories that are not in the first proper subset, i.e., the first neural network is more likely to incorrectly classify network inputs as belonging to categories in the first proper subset than categories not in the first proper subset. Generally, the system can select the first proper subset so that the first proper subset includes the categories in the "tail" of the training data frequency distribution. For example, the system can select, as the first proper subset, a threshold number of categories that have the smallest frequency of occurrence or can select categories in increasing order of frequency of occurrence, i.e., starting with the smallest frequency of occurrence, until the sum of the frequencies for the selected classes exceeds a threshold value.

In some other implementations, the system determines whether the first network output is likely to be inaccurate using a margin-based approach, i.e., based on differences between scores for different categories in the first set. As a particular example, the system can determine whether the difference between (i) the highest first score for any category in the first set of categories and (ii) the second highest first score for any category in the first set satisfies a threshold, i.e., is less than the threshold. If the difference is less than the threshold, the system determines that the first network output is likely to be inaccurate. Thus, in these implementations, inputs with low margin are determined to be "hard" inputs while inputs with "high" margin are determined to be "easy" and are not routed to the second neural network.

As another example, as described above, the first neural network can be configured to generate a first score for an "abstain" class in addition to the first scores for the first set of categories. In this example, the system can determine whether the first score for the abstain class is higher than the first score for any of the first set of categories and then determine that the first network output is likely to be inaccurate only when the first score for the abstain class is higher than the first score for any of the first set of categories.

In this example, as will be described below, the system can train the neural network using an objective that encourages the first neural network to assign high scores to the abstain class for "hard" examples, i.e., examples that the first neural network is not confident in classifying correctly.

As yet another example, when the first neural network is configured to generate a first score for the abstain class, the system can determine that the first network output is inaccurate if either (i) the first score for the abstain class is higher than the first score for any of the first set of categories or (ii) the difference between (a) the highest first score for any category in the first set of categories and (b) the second highest first score for any category in the first set satisfies the threshold, i.e., is less than the threshold. That is, the system determines that the first network output is likely to be accurate only if (i) the first score for the abstain class is not higher than the first score for all of the first set of categories, i.e., at least one category has a score that is at least as high as the score for the abstain class, an (ii) the difference between (a) the highest first score for any category in the first set of categories and (b) the second highest first score for any category in the first set does not satisfy the threshold, i.e., is greater than or equal to the threshold.

In response to determining that the first network output is likely to be inaccurate, the system provides the new network input as input to the second neural network (step 208). The second neural network is configured to process the new network input to generate a second network output that includes a respective second score for each of a second plurality of categories. The second set of categories includes all of the categories in the first set of categories and, optionally, one or more additional categories.

The system then classifies the new network input based on the second network output (step 210). For example, the system can classify the network input as belonging to one or more categories having the highest second scores.

In response to determining that the first network output is not likely to be inaccurate, the system classifies the new network input based on the first network output without providing the new network input as input to the second neural network (step 212). For example, the system can classify the network input as belonging to one or more categories having the highest first scores.

As described above, in some implementations, the second neural network is deployed on one or more second computers remote from the edge computing device. For example, the second neural network can be deployed in a cloud computing system while the first neural network is deployed on the edge device. In these implementations, the network input is received at the edge device and steps 202, 204, 206 and, when performed, step 212 are performed locally on the edge device. In these implementations, to provide the new network input as input to the second neural network, the system provides the new network input from the edge computing device to the one or more second computers over a data communication network. The edge device then obtains the second network output from the second computer(s) over the data communication network.

Figure 3:
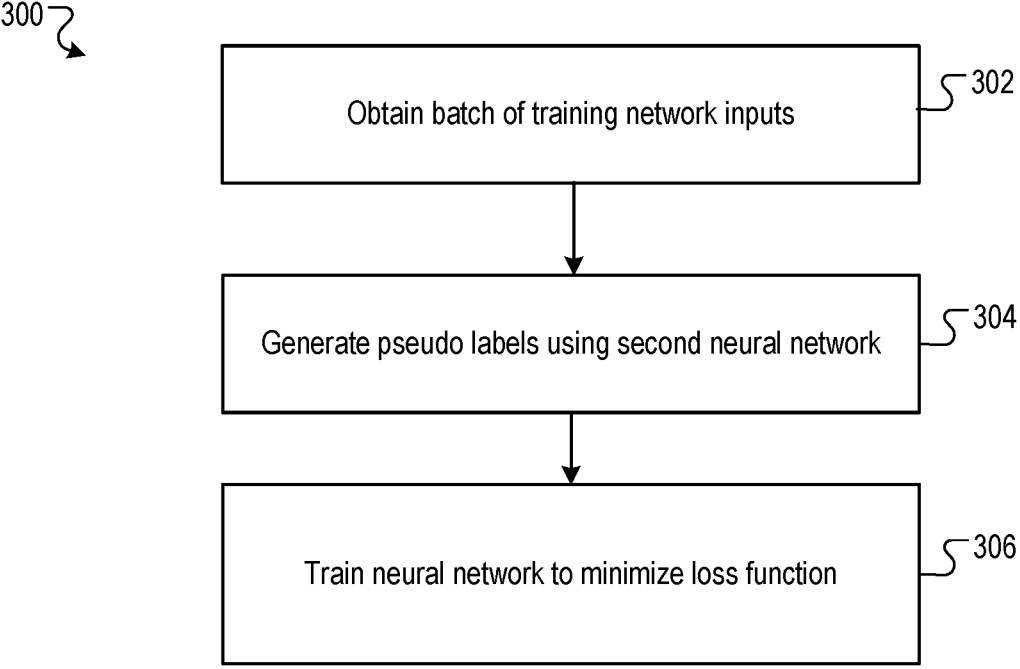
FIG. 3 is a flow diagram of an example process for training the first neural network.

FIG. 3 is a flow diagram of an example process 300 for training the first neural network. For convenience, the process 300 will be described as being performed by a system of one or more computers located in one or more locations. For example, a training system, e.g., the training system 100 of FIG. 1, appropriately programmed in accordance with this specification, can perform the process 300.

The system can repeatedly perform the process 300 on different batches of training examples to train the first neural network, i.e., to determine trained values of the network parameters of the first neural network, after training the second neural network on training data using conventional supervised learning or semi-supervised learning techniques.

The system obtains a batch of one or more training inputs (step 302).

In some implementations, some or all of the training inputs are associated with a label for the training input that identifies a ground truth category for the training input.

In particular, the system can sample the batch of one or more training inputs from a set of training data for training the first neural network. The training data can be the same as the training data used to train the second neural network or a different set of training data, e.g., a larger set of training data that includes more training inputs than the set used to train the second neural network, e.g., that includes unlabeled training inputs in addition to those with labels.

The system can use any appropriate sampling technique to sample the batch from the set of training data. For example, the system can sample a fixed number of training examples uniformly at random from the set of training data. As another example, the system can sample the training examples using over-sampling or under-sampling.

For each training input in the batch, the system generates a pseudo label for the batch using the second neural network (step 304). That is, the system processes the training input using the trained second neural network and uses the second network output, i.e., the score distribution generated by the second neural network, as the pseudo label for the training input. In some implementations, the system reduces the temperature hyperparameter for the softmax layer of the second neural network to generate the pseudo labels, i.e., sets the temperature hyperparameter to a value that is lower than the value used at inference.

The system trains the neural network using the pseudo labels to minimize a loss function (step 306).

In particular, the system determines, e.g., through back-propagation, gradients of the loss function with respect to the network parameters of the first neural network.

The system updates the current values of the network parameters using the gradients. In particular, the system updates the current values by mapping the gradients to an update using an appropriate optimizer, e.g., Adam, rmsProp, Adafactor, SGD, and then applying the update, e.g., adding the update to or subtracting the update from, the current values of the network parameters.

The loss function can be any of a variety of distillation loss functions that use the pseudo labels generated by the second neural network.

In some implementations, the loss function is a conventional distillation loss that includes a term that encourages, for any given training network input, a first network output generated by the first neural network for the given training input (optionally, with reduced softmax temperature) to match a pseudo label generated from a second network output generated by the second neural network for the given training input.

In some other implementations, the loss function includes a term that encourages, for any given training network input that has a ground truth label that assigns the given training network input to any of a predetermined proper subset of the second plurality of categories, a first network output generated by the first neural network (optionally with reduced temperature) for the given training input to match a pseudo label generated from a second network output generated by the second neural network for the given training input. For example, for any given training network input that has a ground truth label that assigns the given training network input to any of the predetermined proper subset of the second plurality of categories, the term can measure a cross entropy between (i) the first network output generated by the first neural network (optionally with reduced temperature) for the given training input and (ii) the pseudo label generated from the second network output generated by the second neural network for the given training input.

In these implementations, the term encourages, for any given training network input that has a ground truth label that assigns the given training network input to any category that is not in the predetermined proper subset of the plurality of categories, a first network output generated by the first neural network for the given training input to match a distribution that is independent of any second network output generated by the second neural network for the given training input. For example, for any given training network input that has a ground truth label that assigns the given training network input to any category that is not in the predetermined proper subset of the second plurality of categories, loss term can measure a cross entropy between (i) the first network output generated by the first neural network (optionally with reduced temperature) for the given training input and (ii) the distribution that is independent of any second network output.

For example, the independent distribution can a label-smoothed distribution generated from the ground truth label for the given training network input. The label-smoothed distribution can be an interpolation between the one-hot distribution representing the ground truth label and a uniform distribution over the second set of categories.

As another example, the independent distribution can be a uniform distribution over the second plurality of categories.

As another example, when the first neural network also generates scores for the abstain class, the independent distribution can be a one hot distribution that assigns a non-zero score to only an abstain class, i.e., a one-hot distribution that assigns a one to the abstain class and a zero to all other categories. When the abstain class is included and the ground truth label assigns the given training network input to one of the predetermined proper subset of the second plurality of categories, the term can encourage the first neural network to assign a zero to the abstain class. That is, the term can measure a cross entropy between (i) the first network output generated by the first neural network (optionally with reduced temperature) for the given training input and (ii) a distribution that includes, for each second category, the score for the category in the pseudo label generated from the second network output generated by the second neural network for the given training input and, for the abstain class, a zero.

Generally, the system selects the predetermined proper subset based on a frequency of occurrence of each category in the training data that is used to train the first neural network and that has labels. In particular, the system can select the first proper subset so that the first proper subset includes the categories in the "head" of the training data frequency distribution. For example, the system can select, as the proper subset, a threshold number of categories that have the highest frequency of occurrence or can select categories in decreasing order of frequency of occurrence, i.e., starting with the highest frequency of occurrence, until the sum of the frequencies for the selected classes exceeds a threshold value.

In some other implementations, the loss function that includes a term that encourages, for any given training network input of a predetermined proper subset of the training inputs in the training data, a first network output generated by the first neural network for the given training input to match a pseudo label generated from a second network output generated by the second neural network for the given training input. For example, for any given training network input in predetermined proper subset of the training data, the term can measure a cross entropy between (i) the first network output generated by the first neural network (optionally with reduced temperature) for the given training input and (ii) the pseudo label generated from the second network output generated by the second neural network for the given training input.

In these implementations, the predetermined proper subset of the training inputs in the training data has been selected based on margins between scores in second network outputs generated for the training inputs in the training data by the second neural network. For example, the system can determine whether the difference between (i) the highest first score for any category in the second set of categories and (ii) the second highest first score for any category in the second set is greater than a threshold. If the difference is greater than the threshold, the system determines that the training input is likely to be "easy" and adds the training input to the proper subset.

If the training input is not in the subset, the term encourages the a first network output generated by the first neural network for the given training input to match a distribution that is independent of any second network output generated by the second neural network for the given training input. For example, the distribution can be a label-smoothed distribution generated from the ground truth label for the given training network input. For example, for any given training network input that is not in the predetermined proper, loss term can measure a cross entropy between (i) the first network output generated by the first neural network (optionally with reduced temperature) for the given training input and (ii) the distribution that is independent of any second network output.

For example, the independent distribution can a label-smoothed distribution generated from the ground truth label for the given training network input. The label-smoothed distribution can be an interpolation between the one-hot distribution representing the ground truth label and a uniform distribution over the second set of categories.

As another example, the independent distribution can be a uniform distribution over the second plurality of categories.

As another example, when the first neural network also generates scores for the abstain class, the independent distribution can be a one hot distribution that assigns a non-zero score to only an abstain class, i.e., a one-hot distribution that assigns a one to the abstain class and a zero to all other categories. When the abstain class is included and the given training network input is in the predetermined proper subset, the term can encourage the first neural network to assign a zero to the abstain class. That is, the term can measure a cross entropy between (i) the first network output generated by the first neural network (optionally with reduced temperature) for the given training input and (ii) a distribution that includes, for each second category, the score for the category in the pseudo label generated from the second network output generated by the second neural network for the given training input and, for the abstain class, a zero.

By training using any of the above terms, the system can train the first neural network to more effectively identify the predictions that the first neural network is not confident in while maintaining high accuracy in the predications that the first neural network is confident in.

Optionally, the loss function can include one or more additional terms, e.g., regularization terms or one or more terms that measure errors between first network outputs and ground truth labels.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a sub combination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining a first network input;

processing the first network input using a smaller neural network to generate a first network output for the first network input that comprises a respective first score for each of a first plurality of categories;

determining, from the first network output for the first network input, whether the first network output for the first network input is likely to be inaccurate;

in response to determining that the first network output for the first network input is likely to be inaccurate:

providing the first network input as input to a larger neural network that is configured to process the first network input to generate a second network output for the first network input that comprises a respective second score for each of a second plurality of categories, the second plurality of categories comprising all of the categories in the first plurality of categories, wherein the larger neural network is more computationally expensive than the smaller neural network; and classifying the first network input based on the second network output for the first network input;

obtaining a second network input;

processing the second network input using the smaller neural network to generate a first network output for the second network input that comprises a respective first score for each of the first plurality of categories;

determining, from the first network output for the second network input, whether the first network output for the second network input is likely to be inaccurate; and in response to determining that the first network output for the second network input is not likely to be inaccurate:

classifying second first network input based on the first network output for the second network input without providing the first network input as input to the larger neural network.

2. The method of claim 1, wherein classifying the first network input based on the second network output comprises:

classifying the first network input as belonging to one or more categories having the highest second scores.

3. The method of claim 1, further comprising:

in response to determining that the first network output is not likely to be inaccurate:

classifying the first network input based on the first network output without providing the first network input as input to the larger neural network.

4. The method of claim 1, wherein the one or more computers are an edge computing device and wherein the smaller neural network is deployed on the edge device.

5. The method of claim 4, wherein the smaller neural network is deployed on application-specific integrated circuit (ASIC) or a field-programmable gate array (FPGA) on the edge computing device.

6. The method of claim 4, wherein the larger neural network is deployed on one or more second computers remote from the edge computing device, wherein providing the first network input as input to the larger neural network comprises providing the first network input from the edge computing device to the one or more second computers over a data communication network, and wherein the method further comprises obtaining the second network output over the data communication network.

7. The method of claim 1, wherein determining, from the first network output, whether the first network output is likely to be inaccurate comprises:

determining whether a category having a highest first score is in a predetermined proper subset of the first plurality of categories; and determining that the first network output is likely to be inaccurate when the category having the highest first score is in the predetermined proper subset of the plurality of categories.

8. The method of claim 7, wherein the predetermined proper subset of the plurality of categories has been selected based on a frequency of occurrence of each category in training data that was used to train the smaller neural network.

9. The method of claim 1, wherein determining, from the first network output, whether the first network output is likely to be inaccurate comprises:

determining whether a difference between (i) a highest first score for any category in the first plurality of categories and (ii) a second highest first score for any category in the first plurality of categories satisfies a threshold; and determining that the first network output is likely to be inaccurate when the difference satisfies the threshold.

10. The method of claim 1, wherein the first network output further comprises a first score for an abstain class, and wherein determining, from the first network output, whether the first network output is likely to be inaccurate comprises:

determining whether the first score for the abstain class is higher than the first score for any of the first plurality of categories; and determining that the first network output is likely to be inaccurate when the first score for the abstain class is higher than the first score for any of the first plurality of categories.

11. The method of claim 1, wherein the smaller neural network has been trained using pseudo labels generated by the larger neural network by processing training network inputs.

12. The method of claim 11, wherein the smaller neural network has been trained to minimize a loss function that includes a first term that encourages, for any given training network input that has a ground truth label that assigns the given training network input to any of a predetermined proper subset of the second plurality of categories, a first network output generated by the smaller neural network for the given training input to match a pseudo label generated from a second network output generated by the larger neural network for the given training input.

13. The method of claim 12, wherein the first term encourages, for any given training network input that has a ground truth label that assigns the given training network input to any category that is not in the predetermined proper subset of the plurality of categories, a first network output generated by the smaller neural network for the given training input to match a distribution that is independent of any second network output generated by the larger neural network for the given training input.

14. The method of claim 13, wherein the distribution is a label-smoothed distribution generated from the ground truth label for the given training network input.

15. The method of claim 13, wherein the distribution is a uniform distribution over the second plurality of categories.

16. The method of claim 13, wherein the distribution is a one hot distribution that assigns a non-zero score to only an abstain class.

17. The method of claim 12, wherein the predetermined proper subset of the second plurality of categories has been selected based on a frequency of occurrence of each category in training data that was used to train the smaller neural network.

18. The method of claim 11, wherein the smaller neural network has been trained to minimize a loss function that includes a first term that encourages, for any given training network input of a predetermined proper subset of the training inputs in the training data, a first network output generated by the smaller neural network for the given training input to match a pseudo label generated from a second network output generated by the larger network for the given training input.

19. The method of claim 18, wherein the predetermined proper subset of the training inputs in the training data has been selected based on margins between scores in second network outputs generated for the training inputs in the training data by the larger neural network.

20. The method of claim 1, wherein the smaller neural network has fewer parameters than the larger neural network.

21. A system comprising:

one or more computers; and one or more storage devices storing instructions that, when executed by the one or more computers, cause the one or more computers to perform operations comprising:

obtaining a first network input;

processing the first network input using a smaller neural network to generate a first network output for the first network input that comprises a respective first score for each of a first plurality of categories;

determining, from the first network output for the first network input, whether the first network output for the first network input is likely to be inaccurate;

in response to determining that the first network output for the first network input is likely to be inaccurate:

providing the first network input as input to a larger neural network that is configured to process the first network input to generate a second network output for the first network input that comprises a respective second score for each of a second plurality of categories, the second plurality of categories comprising all of the categories in the first plurality of categories, wherein the larger neural network is more computationally expensive than the smaller neural network; and classifying the first network input based on the second network output for the first network input;

obtaining a second network input;

processing the second network input using the smaller neural network to generate a first network output for the second network input that comprises a respective first score for each of the first plurality of categories;

determining, from the first network output for the second network input, whether the first network output for the second network input is likely to be inaccurate; and in response to determining that the first network output for the second network input is not likely to be inaccurate:

classifying second first network input based on the first network output for the second network input without providing the first network input as input to the larger neural network.

22. One or more non-transitory computer storage media storing instructions that when executed by one or more computers cause the one or more computers to perform operations comprising:

obtaining a first network input;

processing the first network input using a smaller neural network to generate a first network output for the first network input that comprises a respective first score for each of a first plurality of categories;

determining, from the first network output for the first network input, whether the first network output for the first network input is likely to be inaccurate;

in response to determining that the first network output for the first network input is likely to be inaccurate:

providing the first network input as input to a larger neural network that is configured to process the first network input to generate a second network output for the first network input that comprises a respective second score for each of a second plurality of categories, the second plurality of categories comprising all of the categories in the first plurality of categories, wherein the larger neural network is more computationally expensive than the smaller neural network; and classifying the first network input based on the second network output for the first network input;

obtaining a second network input;

processing the second network input using the smaller neural network to generate a first network output for the second network input that comprises a respective first score for each of the first plurality of categories;

determining, from the first network output for the second network input, whether the first network output for the second network input is likely to be inaccurate; and in response to determining that the first network output for the second network input is not likely to be inaccurate:

classifying second first network input based on the first network output for the second network input without providing the first network input as input to the larger neural network.

* * * * *